Aug. 23, 1938.  A. DIEBOLD  2,128,124
APPARATUS FOR CLEANING PIPES
Filed Oct. 31, 1934   3 Sheets-Sheet 1
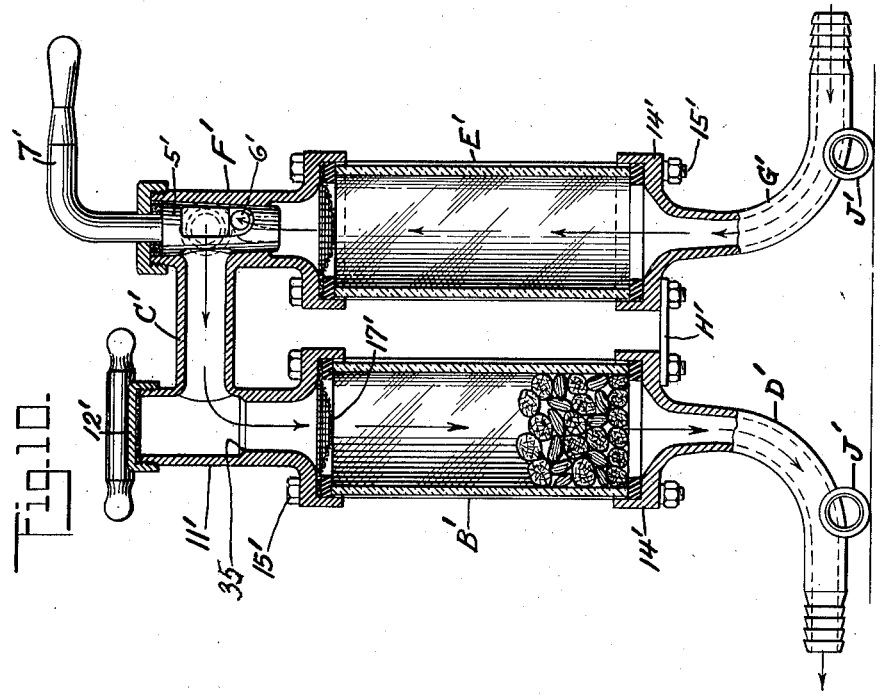
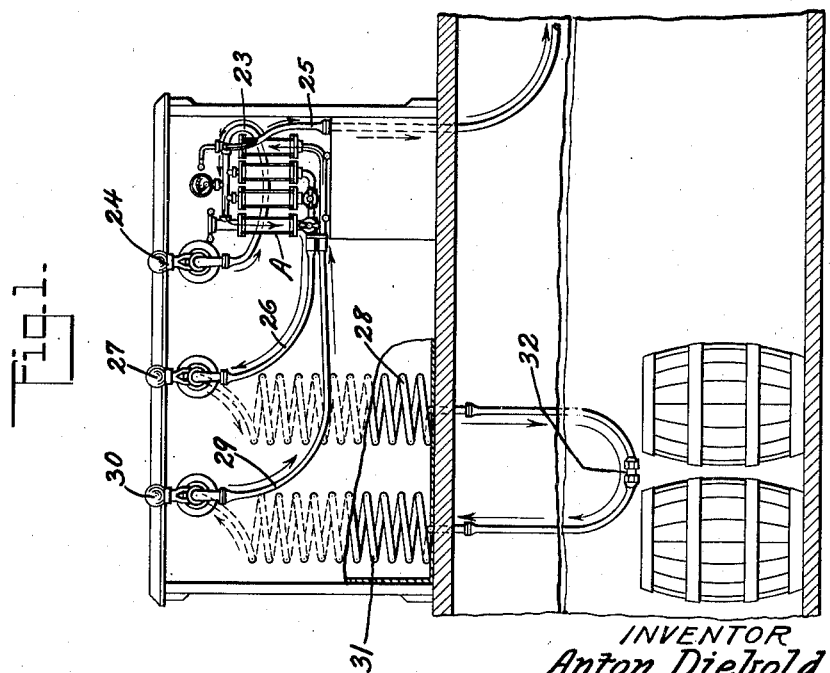
INVENTOR
Anton Diebold
BY Donald U. Rich
ATTORNEY Aug. 23, 1938.   A. DIEBOLD   2,128,124
APPARATUS FOR CLEANING PIPES
Filed Oct. 31, 1934   3 Sheets-Sheet 2
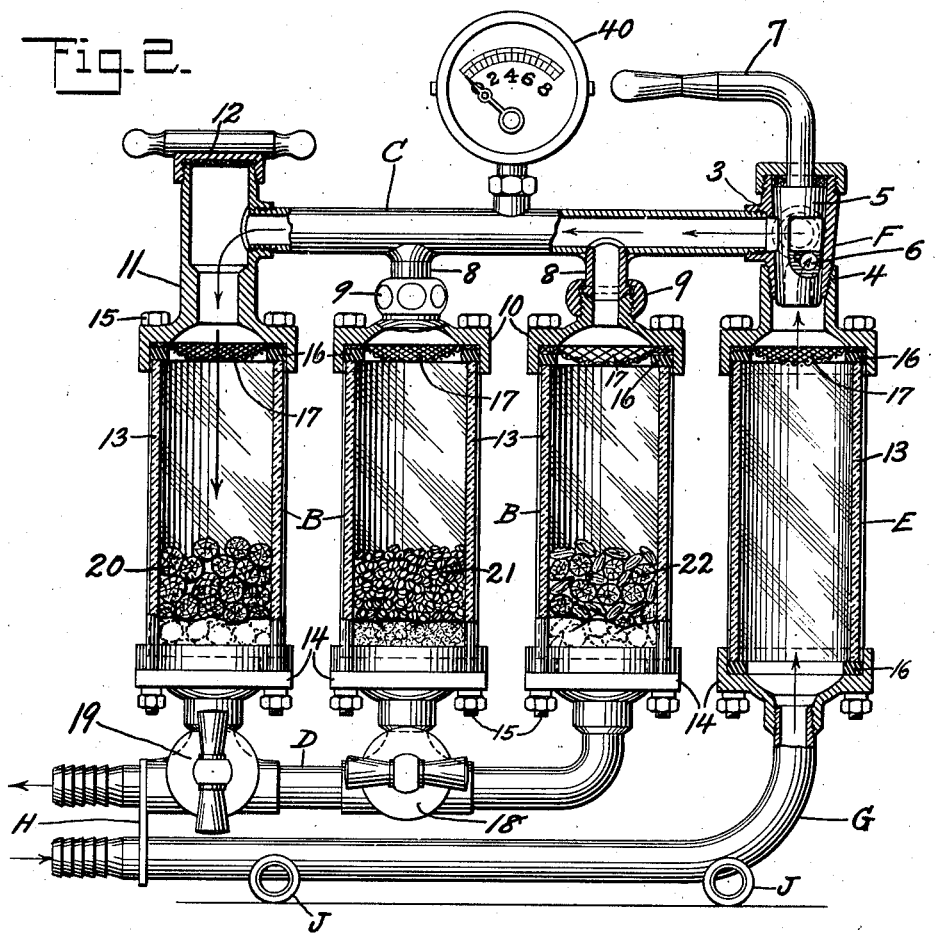
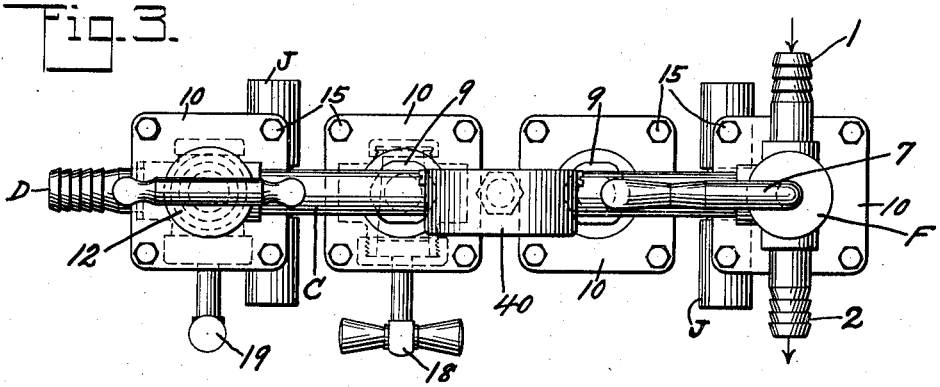
INVENTOR
Anton Diebold
BY Donald U. Rich
ATTORNEY

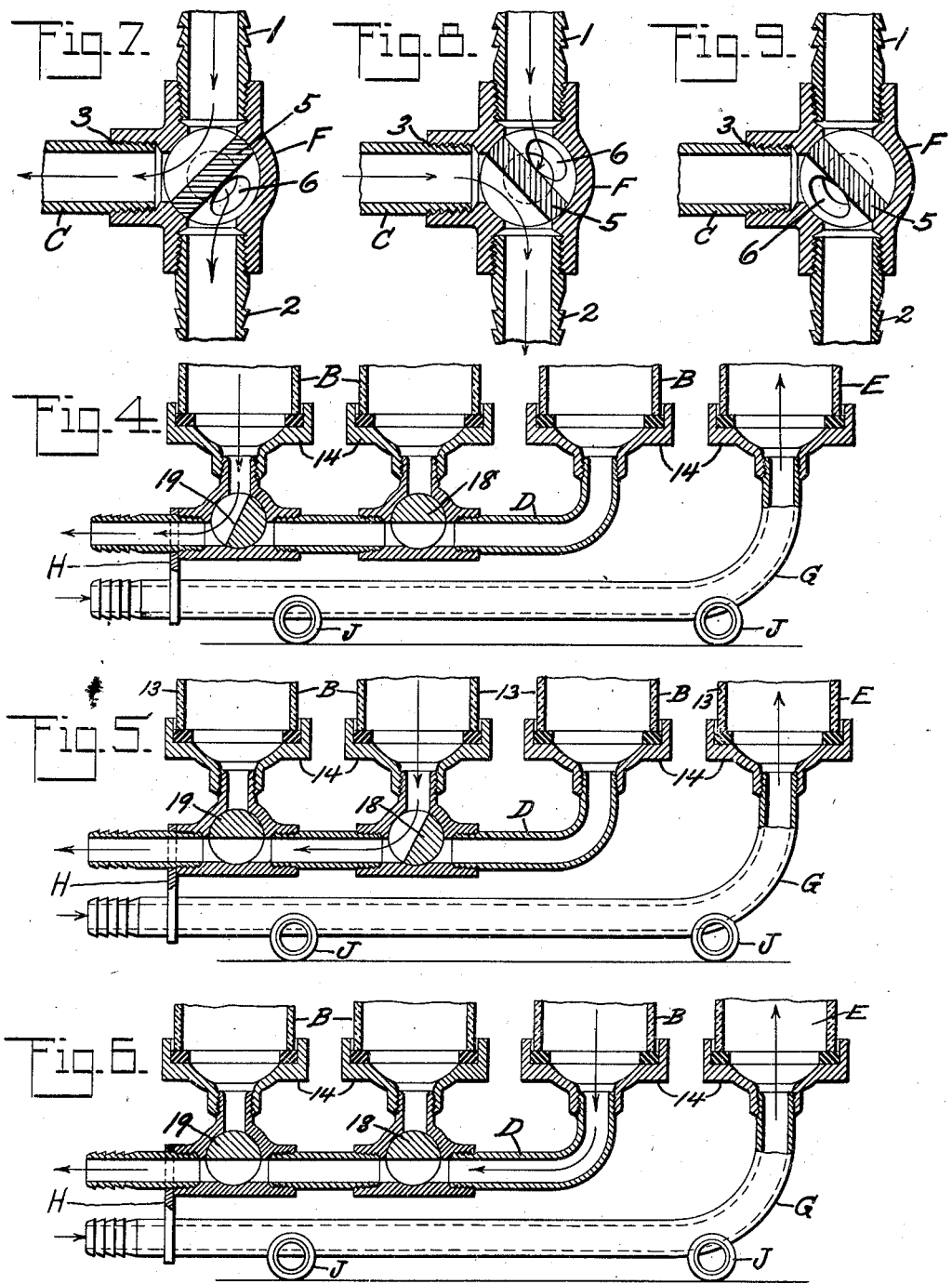

Patented Aug. 23, 1938

2,128,124

UNITED STATES PATENT OFFICE 2,128,124

APPARATUS FOR CLEANING PIPES

Anton Diebold, New York, N. Y.

Application October 31, 1934, Serial No. 750,765

5 Claims. (Cl. 225—12)

This invention relates to an apparatus for cleaning pipes, but more especially piping, coils and fixtures used in the conveying or dispensing of beer and other beverages.

The interior of any pipe, vessel or fixture used for conveying beer becomes encrusted with a deposit of carbonates commonly termed beer stone, which protects the beer from becoming tainted by the material forming the pipe, vessel or fixture. Bacteria also clings to the pipe and, since it grows very rapidly, must be removed regularly if the beer is to remain of first quality.

Beer pipes and fixtures have previously been cleaned by either mechanical or chemical means. The use of mechanical means, such as glass beads, sand or any hard substance, causes a scouring of the pipes which removes the beer stone and exposes the pipe to direct contact with the beer but without completely removing the bacteria. There is also great danger in the use of mechanical means, especially glass beads and sand, of particles of the cleaning material chipping off and remaining in the lower portions of the piping to be later removed by the beer drawn for a customer. The use of chemical means is undesirable and even dangerous for not only is the beer stone removed and the pipe roughened, but traces of the chemicals, some of which are poisonous, remain in the piping and are absorbed by the beer drawn for the customer; also since the bacteria growths are of irregular depth the heavier deposits are not removed by the chemicals and the cleaning is incomplete.

It is an object of this invention to provide an apparatus for cleaning and sterilizing piping by the use of non-abrasive material.

A further object of this invention is the provision of means for cleaning, sterilizing and polishing piping without injury to the pipe interior.

In the drawings Figure 1 is a front elevation of a conventional beer dispensing apparatus showing the present invention applied thereto;

Fig. 2 is a side elevation of the cleaning device partly in section;

Fig. 3 is a plan view of the device;

Figs. 4, 5 and 6 are sectional views of the lower portion of the device and showing the control valves in various positions;

Figs. 7, 8 and 9 are sectional views of the main control valve in various positions, and Fig. 10 shows a modification of the device.

Referring to the drawings, it will be seen that the device A consists of storage elements B, connected at the top by a header C and at the bottom by valve controlled piping or header D. A receiver E is connected at its top to the header by a main valve body F and at its bottom carries a combined pipe and support G resting on short feet J welded in place. The pipes G and D are connected by a plate H to form a complete self supporting unit.

The main valve body F is provided with a pressure inlet 1, pressure outlet 2, top header connection 3 and receiver connection 4. The valve plug 5 is provided with a substantially axial port 6 and a control handle 7.

The header C is provided with short nipples 8 welded in place and adapted to be coupled by unions 9 to the caps 10 of the storage elements. The header is also provided with a pressure gauge 40 and a combined cap and charging chamber 11 having a removable cover 12.

The storage elements B and receiver element E consist of cylinders 13 formed of glass or other material interposed between top caps 10 and bottom caps 14 connected together by tie bolts 15. These bolts firmly clamp the caps, cylinders and sealing rings 16 together so as to form a pressure tight chamber. The top of each cylinder is provided with a screen 17 of suitable mesh which in the instance shown is clamped between the cap and the sealing ring as shown.

The bottom piping D is connected to each of the bottom caps 14 of the storage elements B and is provided with valves 18 and 19 of the three-way type which control the end and intermediate storage elements.

The end storage element is partially filled with small sponges or other soft material 20 which serves the purpose of swabbing and polishing the pipe. The intermediate storage element is partially filled with tapioca or the like or other relatively soft material 21 and a suitable sterilizing compound, such as natrumperborate or a peroxide compound. The tapioca or other relatively soft material used may be chemically treated in lieu of introducing the material and chemical separately. The inner end storage element is partially filled with a mixture 22 of firm cereals and a soft material, for example, rice and sponges, which is used for the preliminary cleaning.

The pipes D, G, 1 and 2 are fluted to receive tubing used to couple the unit to the piping which is to be cleaned. In Fig. 1 the unit is shown with the pressure inlet 1 coupled by tube 23 to a pressure source or water faucet 24, while the outlet 2 is coupled by tube 25 to the waste pipe or drain. Pipe D is coupled by tubing 26 to a fixture 27 at one end of a pipe 28, while pipe G is coupled by a tube 29 to a fixture 30 at one end of a pipe 31. The ends of pipes 28 and 31 are united by means of the coupling 32 to provide a closed circuit. This arrangement is purely representative since the unit may be used to clean either one or a plurality of pipes as is obvious.

In use the apparatus is coupled in the manner explained and as shown in Fig. 1 with the valves 18 and 19 in the position shown in Fig. 6 and the master valve in the position shown in Fig. 9. The master valve is now turned to the position shown in Fig. 7 which will permit water under pressure to flow as indicated by the arrows and force the mixture 22 through the piping and into receiver E where it is checked by screen 17 while the water flows out through port 6, outlet 2 and tube 25 to the drain. The master valve is then turned to the position indicated in Fig. 8 and the water flowing through port 6 now forces the mixture 22 back through the piping into the storage chamber where it is checked by the screen while the water flows out through outlet 2 and tube 25 to the drain. It is obvious that by oscillating the master valve back and forth between the positions indicated in Figs. 7 and 8 the cleaning material may be forced back and forth through the pipe as often as is necessary. When the water flowing from the pipe is clear the cleaning operation is complete and with the material returned to its storage element the master valve may be turned to the neutral position indicated in Fig. 9.

The valve 18 is then turned as indicated in Fig. 5 to permit the discharge of the cleaning and sterilizing material 21 in the intermediate element and upon oscillation of the master valve as before the material is forced back and forth through the pipe for as long as is necessary. After completion of the cleaning and sterilizing, with the master valve in neutral position, the cover 12 may be removed if desired and salt for sweetening placed in the end chamber after which the cap is replaced, valve 19 opened as in Fig. 4 and upon operation of the master valve the material will be forced back and forth as before, thus polishing and sweetening the pipe.

In the modification shown in Fig. 10 a simplified arrangement is provided wherein the intermediate and inner end storage elements are eliminated and the various materials used for the different steps are introduced as needed into the cylinder B' by removal of the bolts 15', or the cover 12' may be removed and the materials introduced through the chamber 11' in which case the screen 17' will be made readily removable as is obvious to one skilled in the art. As an example of this readily removable screen, the screen may be positioned within the chamber 11' and be supported on the shoulder 35 in said chamber in such a position as to prevent passage of the material from the cylinder B' to the header C'. This construction obviously permits easy removal of the screen from the chamber 11' whereby to permit the insertion of new material into the cylinder B'. To further simplify the construction the header C', valve body F" and chamber 11' are formed integral to provide a rigid upper portion while the lower caps 14' are connected together by a strap H' with the pipes D', G' supported by the feet J' to form a compact self-supporting unit. In this modification the master valve is the same as previously explained and the device is operated in exactly the same manner.

It is seen from the above that applicant has provided a device especially adapted for the use of relatively soft materials so treated and manipulated that they will thoroughly clean the piping of any loose or protruding deposits and bacteria, leaving the interior clean, sweet and polished. It will further be apparent that the present invention provides a method for effectively cleaning pipes, particularly those employed in connection with the dispensing of beer without removal of the beer stone.

What is claimed is:

1. In a pipe cleaning apparatus comprising a storage element, a receiver element, a control valve above said receiver element, a charging chamber above said storage element, means connecting said valve and charging chamber, means adjacent the bottom of said elements adapted for connection to the piping which is to be cleaned, and means clamping said control valve, charging chamber, and last mentioned means to said elements.

2. In an apparatus for cleaning pipe, the combination of a first storage element adapted to contain a mixture of firm cereals and soft material, a second storage element adapted to contain a mixture of semi-firm material and chemical, a third storage element adapted to contain a mixture of soft material and chemical, a receiver element adapted to receive the material from any one of said storage elements, a top header connecting said elements, a bottom header connecting the storage elements, a valve in said bottom header adapted to control passage of the soft material and chemical to and from the third storage element, an additional valve in said bottom header adapted to control passage of the semi-firm material and chemical to and from the second storage element, means connecting the lower header and receiver with the pipe to be cleaned, and a normally closed main control valve in the upper header adjacent the receiver element adapted to permit passage of fluid under pressure selectively to either the upper header or the receiver whereby the selected material may be forced back and forth through the pipe.

3. In an apparatus for cleaning pipe, the combination of a first storage element adapted to contain a cleaning material, a second storage element adapted to contain a cleaning and sterilizing material, a third storage element adapted to contain a polishing material, a receiver element adapted to receive the material from any one of said storage elements, a header having communication with each of said elements, an additional header having communication with each of the storage elements, valves in said additional header adapted to selectively control passage of material to and from the storage elements, means connecting the additional header and receiver with the pipe to be cleaned, a main control valve in the first mentioned header adjacent the receiver element adapted to permit passage of fluid under pressure selectively to either the receiver element or first mentioned header, said valves being so arranged as to permit independent and sequential cleaning, sterilizing and polishing of the pipe.

4. In a cleaner for tubular members, the combination of a plurality of upright vessels, a header connecting the lower ends of said vessels, a plurality of valve casings forming part of said header, means on said header adapted for connection to one end of a tubular member to be cleaned, valves in said casing each formed with a port adapted to connect one of said vessels with said means, a receiver vessel adapted for connection at its lower end to the other end of said tubular member, an inlet pipe for supplying a pressure fluid to said vessels, a discharge pipe for soiled fluid from said vessels and tubular member, and valve-controlled means cooperating with said valves and with said inlet and discharge pipes, said valve-controlled means being connected to the upper ends of said vessels for directing said fluid through any one of said vessels, said tubular member and said receiver vessel alternately in opposite directions.

5. In a cleaner for tubular members, the combination of a pair of upright vessels, a header connecting the lower ends of said vessels, a valve casing forming part of said header, means on said header adapted for connection to one end of a tubular member to be cleaned; a valve in said casing formed with a port adapted to connect either of said vessels with said means, a third upright vessel adapted for connection at its lower end to the other end of said tubular member, an inlet pipe for a pressure fluid, a discharge pipe for soiled fluid from said vessels and tubular member, and valve-controlled means cooperating with said valve and with said inlet and discharge pipes and connected to the upper ends of said vessels for directing said fluid through either of said pair of vessels, said tubular member, and said third vessel alternately in opposite directions.

ANTON DIEBOLD.